(12) United States Patent
Park (10) Patent No.: US 9,069,140 B2
(45) Date of Patent: Jun. 30, 2015

(54) OPTICAL CONNECTOR

(71) Applicant: Chan Soul Park, Daejeon (KR)

(72) Inventor: Chan Soul Park, Daejeon (KR)

( * ) Notice: Subject to any disclaimer, the term of this patent is extended or adjusted under 35 U.S.C. 154(b) by 123 days.

(21) Appl. No.: 13/684,137

(22) Filed: Nov. 21, 2012

(65) Prior Publication Data

US 2013/0156382 A1 Jun. 20, 2013

(30) Foreign Application Priority Data

Nov. 21, 2011 (KR) .................. 10-2011-0121356

(51) Int. Cl.
*G02B 6/36* (2006.01)
*G02B 6/38* (2006.01)
*G02B 6/255* (2006.01)

(52) U.S. Cl.
CPC ............... *G02B 6/36* (2013.01); *G02B 6/3874* (2013.01); *G02B 6/3846* (2013.01); *G02B 6/3854* (2013.01); *G02B 6/3887* (2013.01); *G02B 6/3855* (2013.01); *G02B 6/3825* (2013.01); *G02B 6/3821* (2013.01); *G02B 6/2551* (2013.01); *G02B 6/2558* (2013.01)

(58) Field of Classification Search
CPC .. G02B 6/3846; G02B 6/3825; G02B 6/3874; G02B 6/2551; G02B 6/36; G02B 6/3855; G02B 6/3854; G02B 6/3887
USPC ...................................... 385/53–94
See application file for complete search history.

(56) References Cited

U.S. PATENT DOCUMENTS

| | | | | |
|---|---|---|---|---|
| 5,963,692 A * | 10/1999 | Marazzi et al. | ................. | 385/80 |
| 6,179,482 B1 * | 1/2001 | Takizawa et al. | ............... | 385/81 |
| 7,036,993 B2 * | 5/2006 | Luther et al. | ..................... | 385/53 |
| 7,104,702 B2 * | 9/2006 | Barnes et al. | ................... | 385/77 |
| 7,204,644 B2 * | 4/2007 | Barnes et al. | ................... | 385/77 |
| 7,331,718 B2 * | 2/2008 | Yazaki et al. | ................... | 385/78 |
| 7,934,874 B2 * | 5/2011 | Honma et al. | ................. | 385/97 |
| 2005/0141817 A1 * | 6/2005 | Yazaki et al. | ................... | 385/78 |
| 2007/0206904 A1 | 9/2007 | Sezerman et al. | | |
| 2009/0238523 A1 * | 9/2009 | Honma et al. | ................. | 385/96 |
| 2009/0252458 A1 * | 10/2009 | Baechtle et al. | ................ | 385/78 |
| 2012/0288238 A1 * | 11/2012 | Park et al. | ........................ | 385/80 |

FOREIGN PATENT DOCUMENTS

| | | |
|---|---|---|
| CN | 201654275 U | 11/2010 |
| CN | 102116911 A | 7/2011 |
| EP | 2249189 A1 | 11/2010 |
| JP | 2008-225461 | 9/2008 |
| JP | 2009-69607 | 4/2009 |
| KR | 10-0669947 | 1/2007 |
| KR | 10-2007-0045972 | 5/2007 |
| KR | 10-2009-0078350 | 7/2009 |
| KR | 10-2009-0083373 | 8/2009 |
| KR | 10-1038195 | 6/2011 |

* cited by examiner

*Primary Examiner* — Ryan Lepisto
*Assistant Examiner* — Guy Anderson
(74) *Attorney, Agent, or Firm* — Revolution IP, PLLC (57) ABSTRACT

An optical fiber connector by which a worker can easily connect optical fibers at an on-site location, and in particular to an optical fiber connector which makes it possible to prevent the problems that an adhered state of a ferrule optical fiber installed in a ferrule is broken owing to a bending phenomenon occurring when an elastic member ferrule moves within an allowable (set) movement range owing to the nature of elastic force member or a connected state of a fusion connection part is damaged.

19 Claims, 10 Drawing Sheets

OPTICAL CONNECTOR

RELATED APPLICATION

The present application claims priority from Korean Patent Application No. 10-2011-0121356 filed Nov. 21, 2011 in the Korean Intellectual Property Office, which is hereby incorporated by reference in its entirety.

TECHNICAL FIELD

The present invention relates to an optical fiber connector by which a worker can easily connect optical fibers at an on-site location, and in particular to an optical fiber connector which makes it possible to prevent the problems that an adhered state of a ferrule optical fiber installed in a ferrule is broken owing to a bending phenomenon occurring when an elastic member moves within an allowable (set) movement range owing to the nature of elastic force or is a connected state of a fusion connection part is damaged.

BACKGROUND ART

In recent years, a fiber to the home (FTTH) system is provided so as to provide various information including broadcast and communication information by connecting an optical fiber to ordinary homes. The system is widely installed in an apartment and a house. In the above mentioned FTTH system, an optical fiber is connected to a home in such a way that the ends of the optical fiber are finished with an optical fiber connector. Here, a FTTH worker prolongs an optical fiber up to a home by setting the optical fiber a couple of meters longer than an actually needed length in consideration of the connection between the optical fibers. In addition, the worker cuts an optical fiber by the length that is needed for a corresponding home which becomes an on-site location, and assembles an optical fiber connector at each end of the optical fiber, and the assembled optical fiber connector is connected to an optical adaptor and is finally installed at the home.

Various technologies on the above-mentioned optical fiber connector to connected to the optical fiber connector are described in the following patent documents: Korean patent registration publication number 10-0669947; Korean patent publication number 10-2009-0078350; Korean patent publication number 10-2009-0083373; Korean paten publication number 10-2007-0045972; Japanese patent publication number Hei 2009-69607; Japanese patent publication number Hei 2008-225461; and Korean patent registration number 10-1038195.

When connecting the ends of the ferrule optical fiber installed at the ferrule with an adhesive and the ends of the main optical fiber, the conventional optical fiber connector is connected by a mechanical connection method which uses a main cable alignment member configured to accommodate the ends of the ferrule optical fiber and the ends of the main optical fiber as disclosed in the in-site assembling type optical fiber connector of Korean patent registration publication number 10-0669947 or a melted connection method which reinforces the melted connection part with a reinforcing sleeve formed of a shrinkable tube after the ends of the ferrule optical fiber and the ends of the main optical fiber are melted and connected using an optical fiber melting connector (refer to Korean patent publication number 10-2009-0083373; Korean paten publication number 10-2007-0045972; Japanese patent publication number Hei 2009-69607; and Japanese patent publication number Hei 2008-225461).

The present invention is directed to a melted connection method. The optical fiber connector using the above mentioned melted connection method, as shown in FIG. 1, comprises a ferrule 1 including a ferrule optical fiber, an elastic member 2 elastically supporting the ferrule, a plug frame 4 accommodating the ferrule and the elastic member, a stopper 3 installed at the plug frame and fixing the ferrule and the elastic member at the plug frame, a reinforcing sleeve 5 configured to reinforce the ends of the ferrule optical fiber and the melted connection part of the ends of the main optical fiber, a plug handle 6 and a boot 7.

The optical fiber connector of the melted connection method features in that the ferrule is elastically supported by the elastic member, and the elastic member 2 moves within an allowed movement range. In the event that the ferrule moves within a range that the elastic member allows, the adhered state between the ferrule body 1a and the ferrule optical fiber 1b might be damaged or the ferrule optical fiber might become short circuit, and a ferrule optical fiber portion 1b' might be bent.

Figure 1:
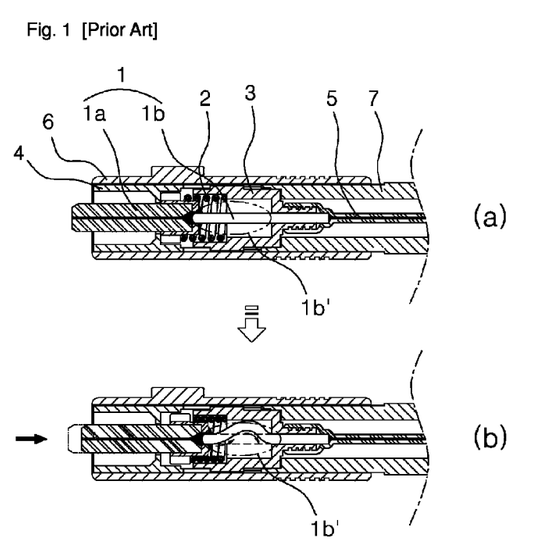
FIG. 1 is a partially assembled cross sectional view of a conventional optical fiber connector, of which (a) is a cross sectional view illustrating an engaged state, and (b) is a cross sectional view illustrating a phenomenon that part of the ferrule optical fiber is bent when an external force is applied to the ferrule.

As shown in FIG. 1b, when the ferrule moves within the range that the elastic member 2 allows when an external force is applied, the portion 2b' of the ferrule optical fiber 1b between the ferrule body 1a and the reinforcing sleeve 7 is bent, and the frequent movements of the ferrule body 1a makes defective the adhered state between the ferrule body and the ferrule optical fiber, and the ferrule optical fiber might become short circuit. When the external force is applied to the ferrule body 1a, part of the ferrule optical fiber is bent, and part of the short ferrule optical fiber is bent, which means that the bent angle is great, so the efficiency of the optical fiber is lowered.

In the optical fiber connector of the conventional melted connection method, when the melted connection part is reinforced by heating the reinforcing sleeve formed of the shrinkable tube, the deformation might occur as the adhesive used so as to integrally connect the ferrule body and the ferrule optical fiber melts, so when assembling the optical fiber connector, it is needed to minimize exposure of the ferrule to heat.

As the exposure of the ferrule to heat is minimized, a cold peeling (room temperature) is mainly performed when peeling the coating of the ferrule optical fiber. At this time, a greater force (load) is applied to the ferrule when peeling the coating of the ferrule optical fiber, so the adhered portion of the ferrule is damaged, and the ferrule optical fiber may short circuit (disconnection).

The problems of the conventional art will be described with reference to the above-mentioned patent documents.

The optical fiber connector disclosed in Korean patent publication number 10-2009-0083373 is directed to a compact size. The structural ferule 7 and the reinforcing (sleeve) sleeve 15 are arranged closer to each other, so the adhesive used for integrally connecting the optical fiber to the ferule might be deformed by the heat when heating for the sake of the heat shrinkage of the reinforcing (arc) sleeve.

The optical fiber connector disclosed in Japanese patent publication number Hei 2008-225461 is directed to forming a protruded portion at the fixture engaged to the frame while making sure that the tensional force is enhanced so that it can integrally engage when the reinforcing sleeve is thermally contracted. When the reinforcing sleeve is thermally contracted and is integrally formed at the protruded portion of the structural fixture, the fixture and the optical fiber of the ferrule are integrated by the reinforcing sleeve. As shown in FIG. 1, when the force (load) is applied to the front ferrule of the connector, the ferrule moves in a longitudinal direction of the optical fiber by means of the elastic member. At this time, as shown in FIG. 1b, the portion 1b' of the ferrule optical fiber 1b having a short length is bent (curved), so the optical fiber might be cut resulting in a short circuit or it might be bent at a great angle, so the loss ratio might be greatly increased.

The optical fiber connectors of Korean patent publication number 10-2009-0083373; Japanese patent publication number Hei 2009-69607; Japanese patent publication number Hei 2008-225461 have features in that the optical fiber is peeled at the factory and is assembled to the ferrule using the adhesive and is cut and supplied to the on-site location. If it is supplied with the coating unpeeled, the ferrule optical fiber made by adhering the ferrule and the optical fiber using an adhesive might have a weakened strength at the adhered portion due to the peeling load when peeling at the on-site location, so it is impossible to overcome the deformation and short circuit problems.

As the optical fibers are peeled, adhered, cut and supplied to the on-site location for the sake of the ferrule in the factory, it is hard to handle which results in the increased manufacture cost, and the short circuit might occur during the handing at the on-site location.

In addition, the peeled optical fibers are exposed long in the air, so they might be contaminated by moisture or other contaminants.

As a method for improving the above mentioned problems, Japanese patent publication number Hei 2009-69607 provides a packing technology so as to provide the peeled optical fiber of the ferrule. In the event that they are packed and supplied, the manufacture cost might be increased, and the whole volume of the packed product increases, so the costs needed for the transportation increases.

Figure 2:
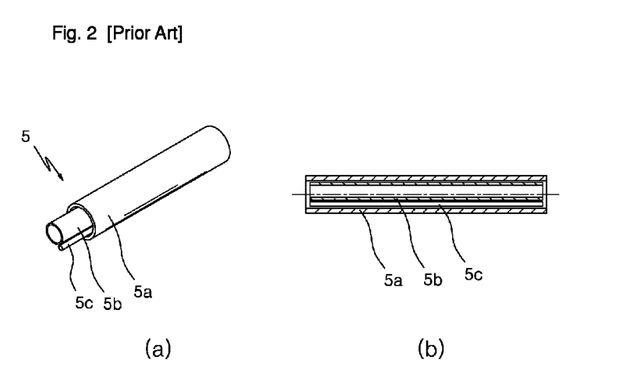
FIG. 2 is a view illustrating a reinforcing sleeve in the construction of a conventional optical fiber connector, of which (a) is a perspective view, and (b) is a cross sectional view.

The reinforcing sleeve 5 as shown in FIG. 2 is adapted to the conventional optical fiber connector and comprises a dual tube formed of two thermal shrinkage tubes of an outer tube 5a and an inner tube 5b and a metallic reinforcing pin 5c, so the thermal shrinkage takes long due to the dual tube during the heating for the sake of thermal shrinkage.

Figure 3:
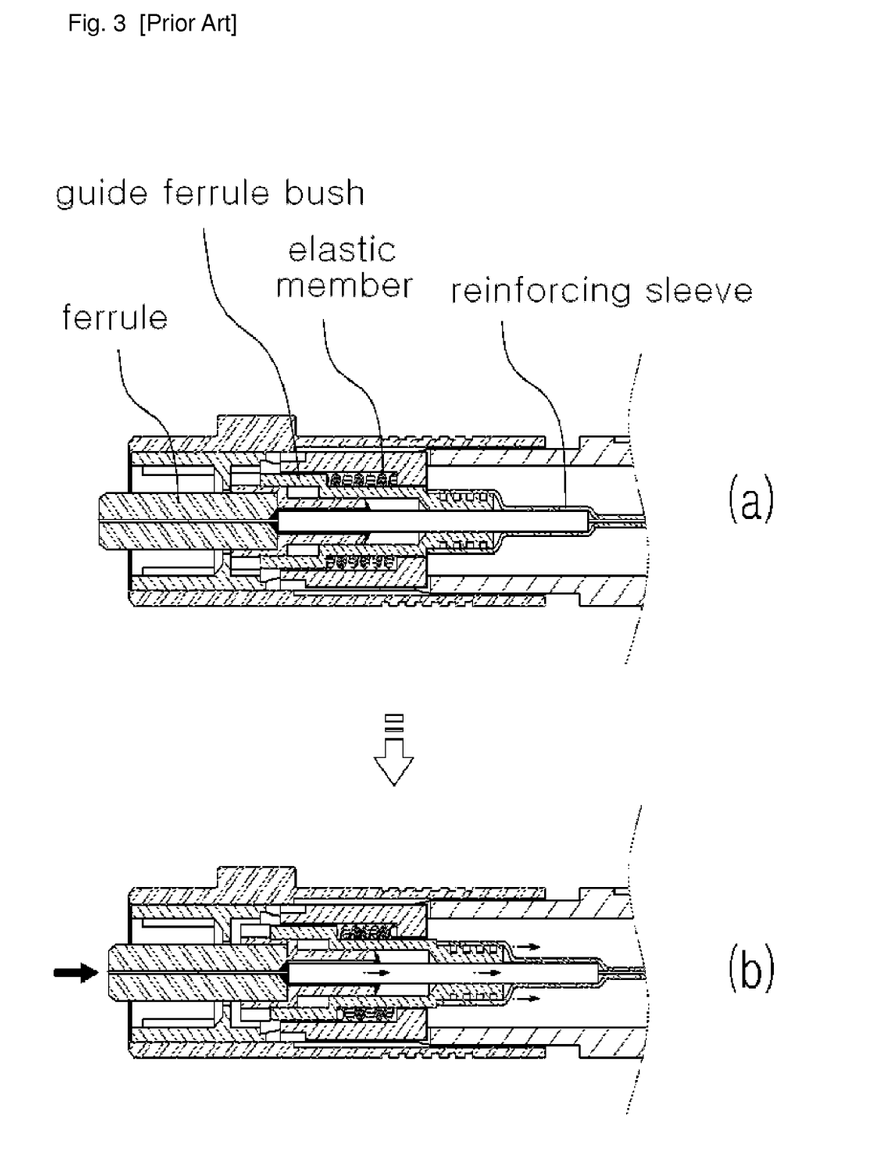
FIG. 3 is a cross sectional view illustrating an operation state of a conventional connector provided from the same applicant as the present invention, of which (a) is a partial cross sectional view illustrating an engaged state of an optical fiber connector, and (b) is a partial cross sectional view illustrating an optical fiber connector when a force is applied to the ferrule in a longitudinal direction of an optical fiber in an engaged state.

In order to improve the above mentioned problems, the applicant of the is present application provided the optical fiber connector of Korean registration number 10-1038195 and the optical fiber connector made by the assembling method of the same as shown in FIG. 3.

In case of the optical fiber connector of the patent registration number 10-1038195, the ferrule can move in the longitudinal direction of the optical fiber when an external force is applied by means of the elastic member, so the reinforcing sleeve configured to reinforce the melted connection part might be bent. The optical fiber connector of the patent registration number 10-1038195, as shown in FIG. 1, can improve the problems that the cut losses and the increased loss ratio increase as it is bent at a great angle; however as the reinforcing sleeve is frequently bent, the cut losses or the increased loss ratio still occur.

SUMMARY

Accordingly, an embodiment of the present invention is made to improve an embodiment of the optical fiber connector of Korean patent registration number 10-1038195 of the same applicant as the present application while improving the problems encountered in the conventional art and it is an aspect of the present invention to provide an optical fiber connector having features in that it is possible to overcome the hard handling and increased unit cost problems which occur as the ferrule optical fibers are supplied unpeeled and are peeled at an on-site location and are assembled while making sure that the ferrule optical fiber can be bent at a great angle at the portions of the ferrule or the melted connection portions can be bent, thus preventing the cut losses and increased loss ratio which occur due to the bending.

In addition, it is another aspect of the present invention to provide an optical fiber connector featuring in that as the structure is simple, the worker can work easily, and as the number of the elements decreases, the manufacture cost decreases, so it is possible to supply the products at lower costs.

First of all, to achieve the above objects, there is provided an optical fiber connector in which a ferrule optical fiber accommodated in a ferrule elastically supported by an elastic member and a main optical fiber are melted and connected using a melted connection part, and the melted connection part is reinforced by a reinforcing sleeve, thus connecting the main optical fiber and the ferrule optical fiber, which comprises a ferrule bush which is disposed between the ferrule and the elastic member, one end of the ferrule bush being engaged with the reinforcing sleeve when reinforcing the melted connection part; and a boot which is installed at an outer side of the reinforcing sleeve and is connected with the ferrule bush.

Second of all, to achieve the above objects, there is provided an optical fiber connector in which a ferrule optical fiber accommodated in a ferrule elastically supported by an elastic member and a main optical fiber are melted and connected by a melted connection part, and the melted connection part is reinforced by a reinforcing sleeve, thus connecting the main optical fiber and the ferrule optical fiber, which comprises the ferrule and a ferrule bush and the ferrule optical fiber which are integrally formed; and an elastic member which is disposed between the ferrule bush and a guide stop ring, with an end portion of the ferrule bush or an end portion of the ferrule optical fiber passing through the guide stop ring and being integrally engaged with the reinforcing sleeve.

The ferrule bush has a through hole into which is inserted part of the enlarged tube formed at the ferrule optical fiber of the ferrule, so the ferrule bush and the ferrule are separated or the ferrule bush is assembled integrally with the ferrule.

An end portion of the ferrule bush or an end portion of the ferrule optical fiber passes through the guide stop ring and is integrally engaged with the reinforcing sleeve.

The main optical fiber is clamped by a clamp cap installed at a boot installed at an outer side of the reinforcing sleeve reinforcing the melted connection part.

An engaging part having at least one protruded groove is formed at an end portion of the ferrule bush, and the engaging part is installed surrounding an end portion of one side of the reinforcing sleeve, so the ferrule and the reinforcing sleeve are integrated.

The ferrule bush can move in a longitudinal direction of the optical fiber by means of the guide stop ring, and the rotation of the ferrule bush is fixed in the axial direction of the optical fiber.

The ferrule optical fiber is supplied in the type of a ferrule assembly, and it is supplied in such a way that the coating of the ferrule optical fiber is not peeled so that the end portions of the ferrule optical fibers can be peeled at an on-site location, and the ferrule bush in the construction belonging to the ferrule assembly is engaged with the reinforcing sleeve reinforcing the melted connection part.

The optical fiber connector according to an embodiment of the present invention has features in that the plug frame accommodating the ferrule and the elastic member is not connected with the boot, and the ferrule bush installed at the ferrule is connected with the boot. When the elastic member is compressed by the external force, the plug frame and the plug handle move in the direction of the ferrule (the left or forward direction in the drawing) which is the direction opposite to the boot, so the optical fiber is not bent by the movement of the ferrule, and it is possible to prevent the problems which occur due to the bending of the optical fiber.

In addition, two elements of the ferrule and the ferrule bush disclosed in the optical fiber connector of Korean patent registration number 10-1038195 of the same applicant as the present invention are integrated into one element, so the assembly becomes simplified during the manufacture and use, and the manufacture cost and the product price can be lowered.

The foregoing and other aspects will become apparent from the following detailed description when considered in conjunction with the accompanying drawing figures.

DETAILED DESCRIPTION

The preferred embodiments of the present invention will be described with reference to the accompanying drawings. The terms and words used in the specification and claims should not be limitedly interpreted as they are from the conventional dictionary, but should be interpreted as the meaning and concepts matching with the technical ideas of the present invention based on the principle that the inventor can most properly define the concepts of the terms so as to describe his invention in the best way.

So, the embodiments and constructions defined in the specification of the invention mean the most preferred embodiments of the present invention, while not representing all the technical concepts of the present invention, and they should be interpreted as there might be various equivalents and modifications which could substitute such things at the time of filing the present invention.

Figure 4:
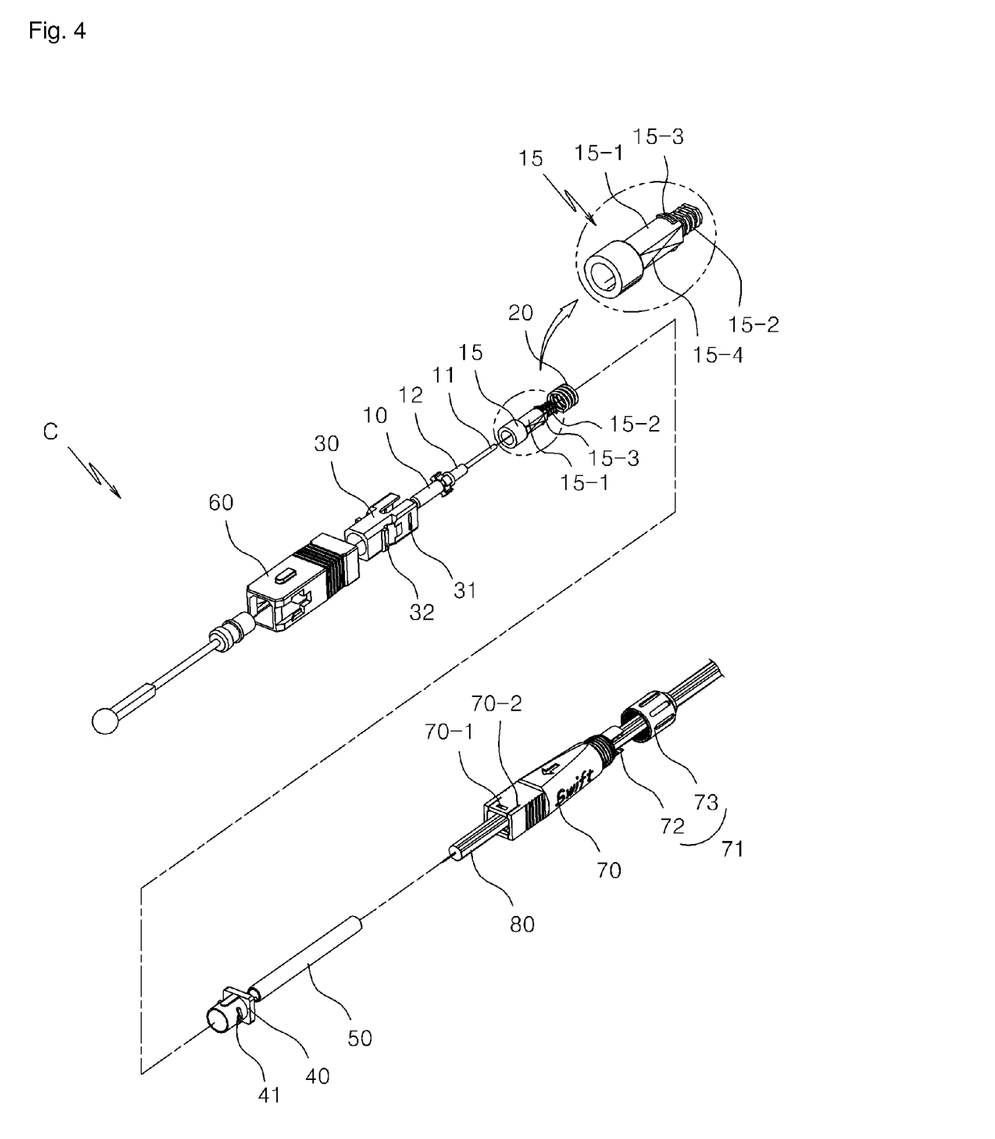
FIG. 4 is a disassembled perspective view illustrating an optical fiber connector according to an embodiment of the present invention.
Figure 6:
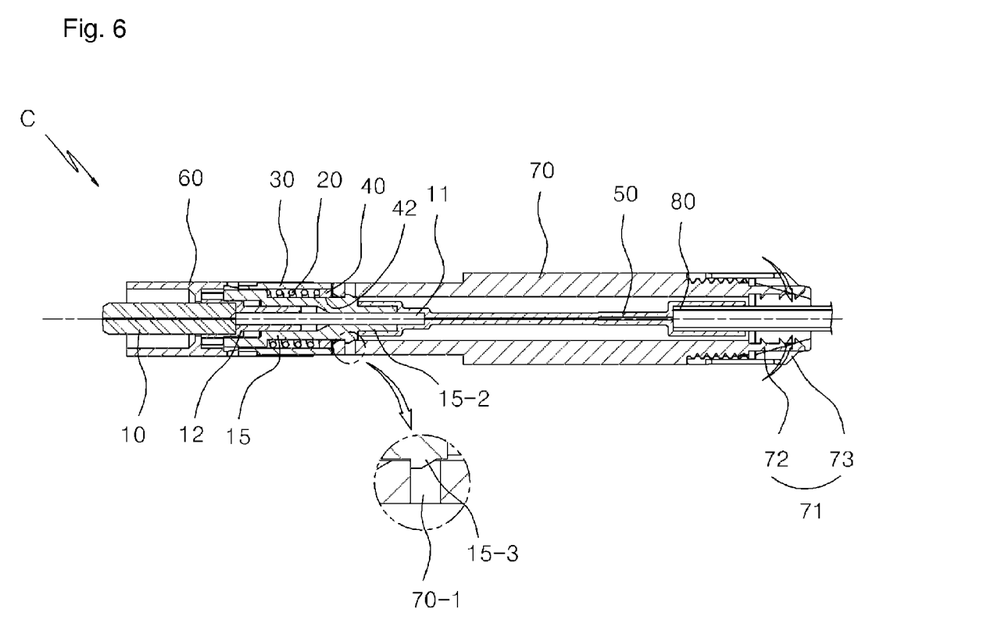
FIG. 6 is an assembled cross sectional view illustrating an optical fiber connector according to an embodiment of the present invention.

As shown in FIGS. 4 and 6, the optical fiber connector "C" of an embodiment of the present invention comprises a ferrule optical fiber 11 adjacent to a ferrule 10, a ferrule bush 15 surrounding the ferrule optical fiber 11, an elastic member 20 configured to provide an elastic force as it is installed at an outer side of the ferrule 10, a plug frame 30 configured to accommodate the ferrule 10 and the elastic member 20, a guide stop ring 40 fixing the ferrule 10 and the elastic member 20, a connector handle 60 accommodating the plug frame 30, a reinforcing sleeve 50 reinforcing the ferrule optical fiber 11 of the ferrule 10 and a melted connection part of the main optical fiber 80, and a boot 70 installed at the outer side of the reinforcing sleeve 50 and connected with the ferrule bush 15 installed at the ferrule 10.

As shown in FIGS. 4 to 8, the ferrule 10 has a through hole at the inner side in which is installed a ferrule optical fiber 11 and a diameter enlargement part 12 is installed at one side of the same. The ferrule optical fiber 11 and the diameter enlargement part 12 are integrated with the ferrule 10 using an adhesive.

The above described construction shares select aspects with the optical fiber connector of Korean patent registration number 10-1038195 and the ferrule which is used in the conventional art.

There is provided a guide ferrule bush 15 accommodating the diameter enlargement part 12 installed at one side of the ferrule 10. The ferrule bush 15 has a step profile at an outer side of the same thus supporting a coil spring which is the elastic member 20. At the other side is provided a guide part 15-1 passing through the guide hole 42 formed at the guide stop ring 40, and at the end portion of the guide part 15-1 is provided an engaging part 15-2 having at least one protruded grove in which is installed the reinforcing sleeve 50 provided so as to reinforce the melted connection part. At the outer surface of the guide part 15-1 is provided at least one plane part 15-4, and at its end portion is provided an engaging protrusion 15-3 for the sake of an engagement with the boot 70.

The engaging part 15-2 allows the ferrule bush 15 and the reinforcing sleeve 50 to be integrated.

Figure 14:
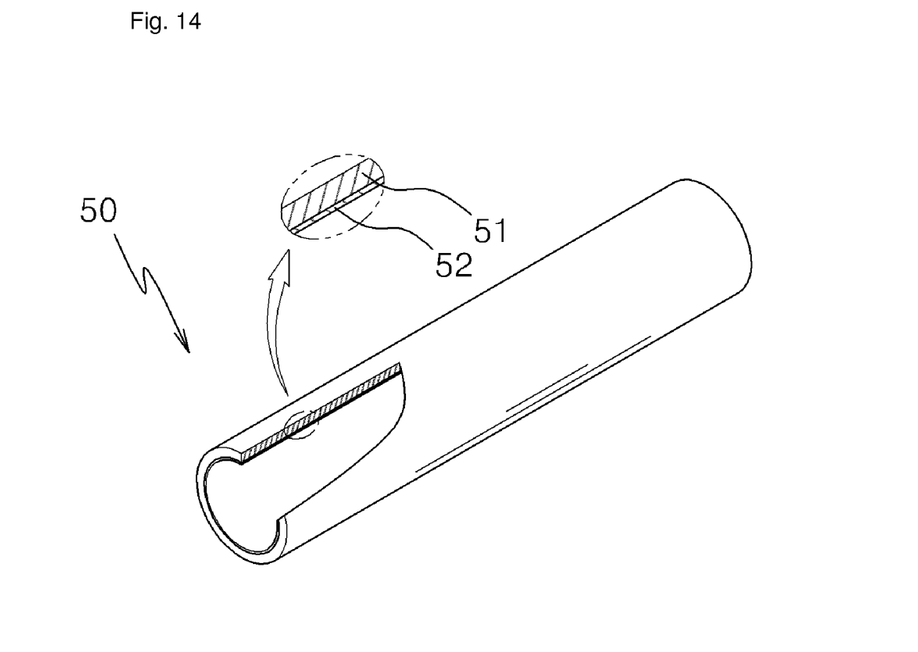
FIG. 14 is a perspective view illustrating a reinforcing sleeve of a construction of an optical fiber connector according to an embodiment of the present invention.

As shown in FIG. 14, the engaging part 15-2 might not be formed at the ferrule bush 15. In other words, the engaging part 15-2 is not formed at the ferrule bush 15, so the reinforcing sleeve 50 can be connected to only the ferrule optical fiber 11.

The plane part 15-4 comes into contact with the plane part formed at the inner surface of the guide hole 42 of the guide stop ring 40 which will be described later, thus allowing the ferrule bush 15 to move in the longitudinal direction of the ferrule optical fiber 11 while not permitting a rotation about the ferrule optical fiber 11.

Figure 7:
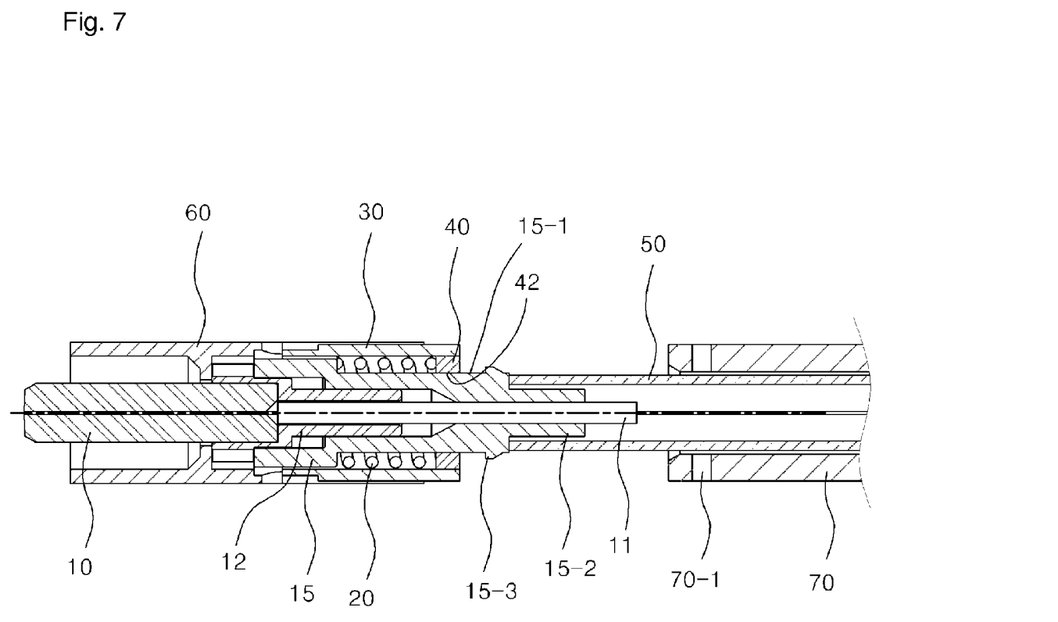
FIG. 7 is a cross sectional view illustrating a ferrule assembly and a reinforcing sleeve and a boot which are parts of the construction of an optical fiber connector according to an embodiment of the present invention while showing a construction before the ferrule assembly and the boot are assembled.
Figure 8:
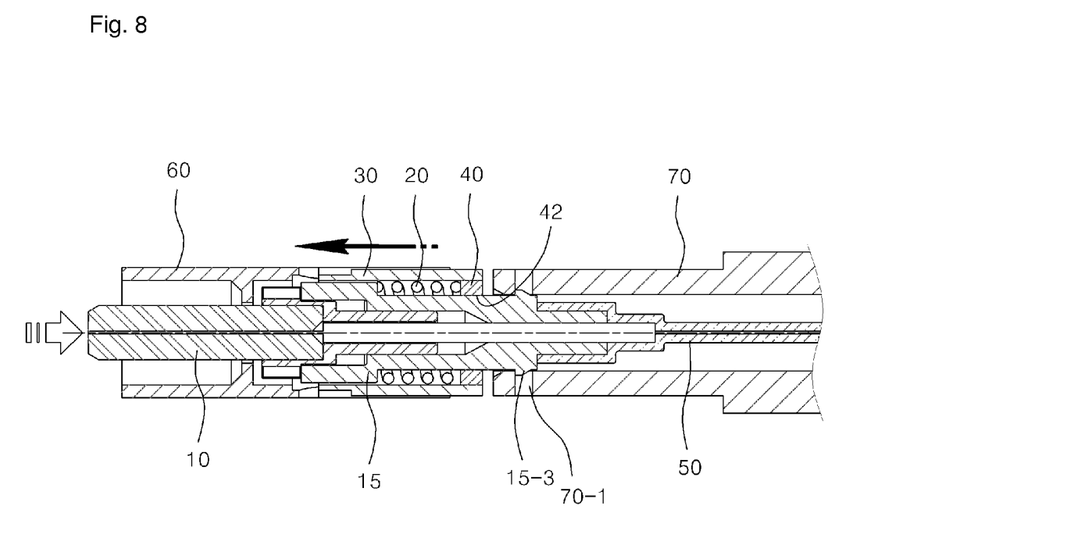
FIG. 8 is a cross sectional view illustrating a ferrule assembly and a reinforcing sleeve and a boot which are parts of a construction of an optical fiber connector according to an embodiment of the present invention while showing a construction after the ferrule assembly and the boot are assembled.
Figure 9:
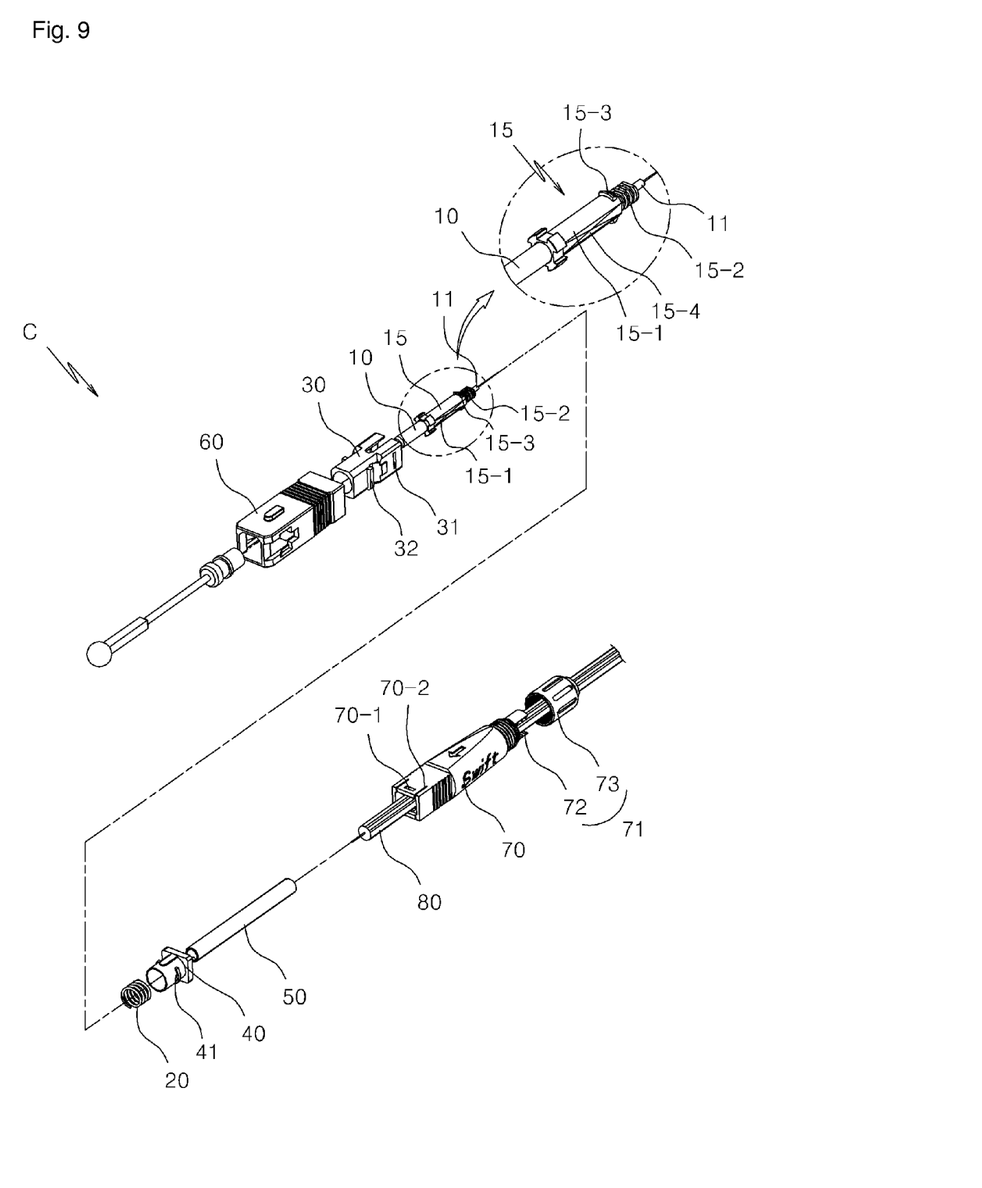
FIG. 9 is a disassembled perspective view illustrating an optical fiber connector according to another embodiment of the present invention.
Figure 10:
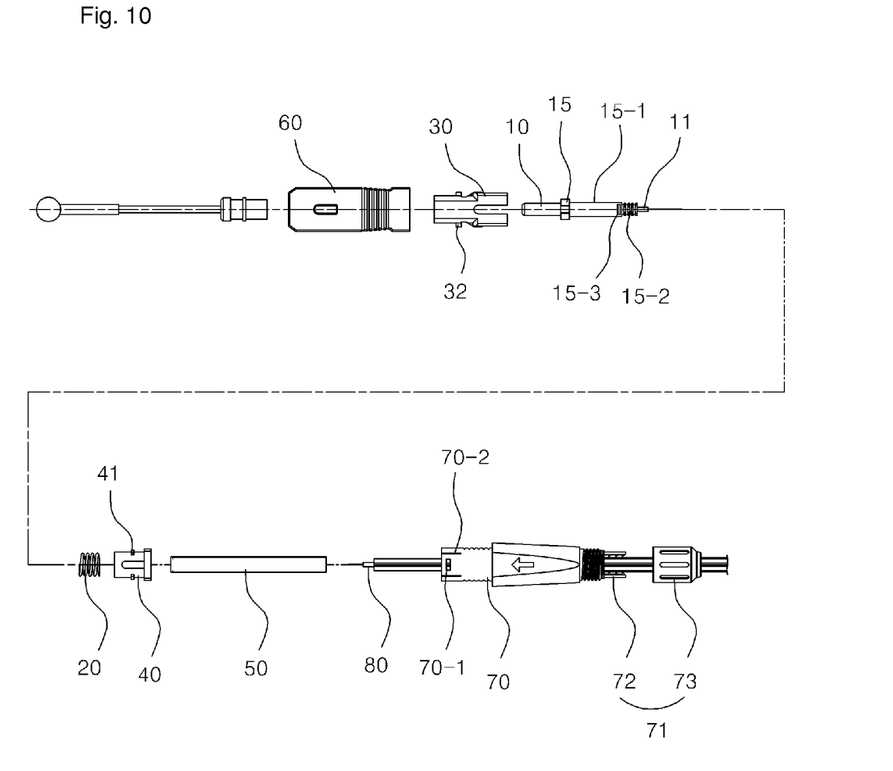
FIG. 10 is a disassembled perspective view illustrating an optical fiber connector according to another embodiment of the present invention.

As shown in FIGS. 7 and 8, the engaging protrusion 15-3 formed at the outer surface of the ferrule bush 15 is inserted into the engaging groove 70-1 formed corresponding to the engaging protrusion 15-3 at the end portion of the boot 70, so the ferrule bush 15 and the boot 70 are engaged. The boot 70 is installed at an outer side of the reinforcing sleeve 50, has the engaging groove 70-1 at an outer side of one end of the boot, and is connected with the ferrule bush 15 by inserting the engaging protrusion 15-3 of the ferrule bush into the boot 70 and engaging into the engaging groove 70-1 of the boot 70 at an on-site location.

The ferrule optical fiber 11 is protruded while passing through the ferrule bush 15 to make sure that one end can be positioned at the ferrule 10, and the other end can melt and connect with the main optical fiber 80, and the protruded end portion is provided with its end unpeeled, so it is peeled at the on-site location.

The ferrule bush 15 features in that it can prevent the portion adhered by the adhesive from being damaged by the heat in such a way to lower the heat which is transferred from the ferrule 10 during the heating process when the ferrule optical fiber 11 is peeled or the reinforcing sleeve is installed.

As shown in FIGS. 4 to 8, the elastic member 30 is made from an ordinary coil spring and is installed at an outer surface of the guide part 15-1 of the ferrule bush 15.

As shown in FIGS. 4 to 8, the plug frame 30 has an engaging groove 31 so as to accommodate one side of the ferrule 10 at the inner side and the ferrule bush 15 and the elastic member 20 and so as to be engaged with the guide stop ring 40 which is inwardly inserted, and an engaging protrusion 32 is provided at the outer side so as to be engaged with the connector handle 60.

As shown in FIGS. 4 to 8, the guide stop ring 40 features in that its one side is inserted into the plug frame 30, thus supporting the ferrule 10 and the ferrule bush 15 and the elastic member 20 which are accommodated in the plug frame 30. At its outer side is provided an engaging protrusion 41, and at its inner side is provided a guide hole 42 having a plane part for the sake of a rotation prevention.

The engaging protrusion 41 is engaged to the engaging groove 31 of the plug frame 30, thus fixing the ferrule 10, the ferrule bush 15 and the elastic member 20 which are accommodated in the plug frame 30, and the plane part formed at the guide groove 42 comes into contact with the plane part 15-4 formed at the guide part 15-1 of the ferrule bush 15 which passes through, while making sure that the ferrule bush 15 can move in the longitudinal direction of the ferrule optical fiber 11 and it cannot rotate about the ferrule optical fiber 11.

As shown in FIG. 8, the reinforcing sleeve 50 is configured to reinforce by surrounding the melted connection part which the ferrule optical fiber 11 and the main optical fiber 80 are connected. As shown in FIG. 14, the reinforcing sleeve 50 is formed of a single tube type formed of the thermal shrinkage tube 51 and the thermal adhering layer 52 made from a thermal adhesive such as a hot melt at the inner side of the thermal shrinkage tube 51 and might include a reinforcing pin which has an elastic force and can be bent. A reinforcing sleeve having an ordinary metallic reinforcing pin can be used.

As shown in FIG. 7, the reinforcing sleeve 50 thermally shrinks when it is installed at the melted connection part to which are connected the ferrule optical fiber 11 and the main optical fiber 80, and heat is applied thereto, thus surrounding in an integrated shape the melted connection part to which are connected the ferrule optical fiber 11 and the main optical fiber 80.

The single tube type reinforcing sleeve 50 having the thermal adhering layer 52 at its inner side can seal the melted connection part of the ferrule optical fiber 11 and the main optical fiber 80 with the aid of the thermal adhering layer 52 when heating it.

The connector handle 60 accommodates the plug frame 30 which accommodates the ferrule 10, the ferrule bush 15 and the elastic member 20 and has at its inner side an engaging groove corresponding to the engaging protrusion 32 formed at the outer side of the pug frame 30.

Figure 5:
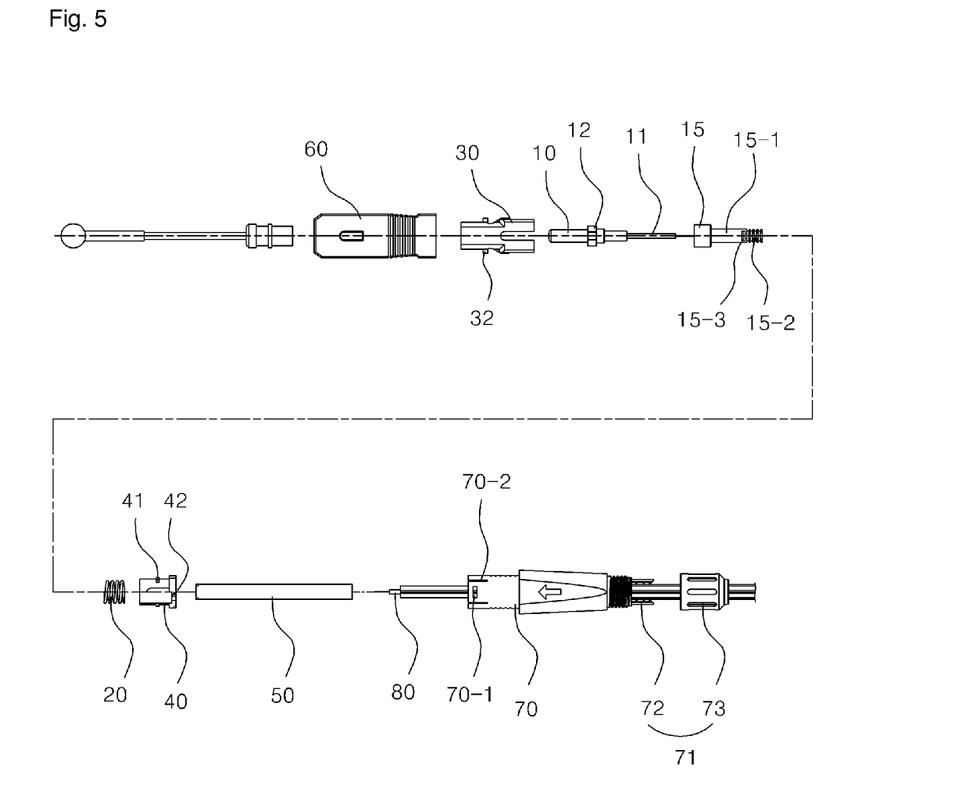
FIG. 5 is a disassembled view of an optical fiber connector according to an embodiment of the present invention.

As shown in FIGS. 7 and 8, the boot 70 is engaged with the ferrule bush 15 and surrounds the reinforcing sleeve 50. As shown in FIGS. 4 and 5, an engaging groove 70-1 is provided so as to engage with the engaging protrusion 15-3 formed at the ferrule bus 15, and at an end portion of it is provided a cut-away portion 70-2 at a peripheral portion of the engaging groove 70-1, thus providing an elastic force to the engaging groove 70-1, so the engaging protrusion 15-3 formed at the ferrule bush 15 can be easily engaged to the engaging groove 70-1.

At the end portion (the side which the main optical fiber is inserted into) opposite to the portion where the ferrule bush 15 is connected might be provided a clamp device 71 for the purpose of clamping the main optical fiber 80.

The clamp device 71 comprises a clamp part 72 which is formed at an end portion of the boot body and the diameter of which changes when an external force is applied, and a pressurizing ring 73 which is installed at an outer side of the clamp part 72 and applies an external force to change the diameter of the clamp part 72.

The clamp part 72 has at least one cut-away portion at the end portion for its diameter to change when an external force is applied, and at its inner side are provided a plurality of clamp protrusions so as to enhance the clamping power.

The pressurizing ring 73 has a taper (slope surface) at the inner surface so as to apply an external force by which the diameter of the clamp part 72 can change.

At an outer surface of the clamp part 72 is formed a male screw groove, and at an inner surface of the pressurizing ring 73 is formed a screw groove, so the clamp part 72 and the pressurizing ring 73 can engaged with each other in a to screw engaging way.

The assembling procedures of the optical fiber connector "C" according to an embodiment of the present invention will be described.

As shown in FIG. 7, into the plug frame 30 are accommodated the ferrule 10, the ferrule bush 15 and the elastic member 20, and the guide stop ring 40 is engaged, and the ferrule 10 in which is installed the ferrule optical fiber 11, the ferrule bush 15, the elastic member 20, the plug frame 30 and the guide stop ring 40 are engaged, thus forming an integrated type ferrule assembly.

The ferrule assembly is featured in that the ends of the optical fiber 11 peeled at the on-site location using an optical fiber melting device and the main optical fiber 80 are melted and connected and reinforced with the reinforcing sleeve 50.

As shown in FIG. 6, the ferrule bush 15 of the ferrule assembly and the boot 70 are engaged using the engaging protrusion 15-3 of the ferrule bush 15 and the engaging groove 70-1 of the boot 70, and in the event that the clamp device 71 is formed at the boot 70, the main optical fiber 80 is clamped using the clamp device 71.

The assembled optical fiber connector "C" of the present invention, as shown in FIG. 8, features in that a bending phenomenon does not occur at the ferrule optical fiber 11 or the main optical fiber 80 or the portion of the optical fiber of the melted connection part reinforced by the reinforcing sleeve adhered to them. When the elastic member 20 is compressed, the plug frame 30 integrally fixed with the guide stop ring 40 and the connector handle 60 moves in the leftward direction when viewing from the drawing.

In other words, as the ferrule bush 15 of the ferrule assembly and the boot 70 are engaged, when the elastic member 20 is compressed as an external force is applied, the optical fiber portion positioned at the inner side of the optical fiber connector "C" is not bent, and the stop ring 40 the plug frame 30 and the connector handle 60 can move in the leftward direction when viewing from the drawing.

As the bending phenomenon does not occur at the optical fiber portion positioned at the inner side of the optical fiber connector "C", it is possible to overcome the problems which used to occur in the conventional art.

When the ferrule 10 is supplied to the ferrule assembly, the relatively smaller elastic member 20 and the guide stop ring 40 might not be lost while peeling the end portions of the ferrule optical fiber 11 by the worker at the on-site location.

FIGS. 9 to 12 show another embodiment of the present invention.

As shown in FIGS. 9 to 12, the optical fiber connector "C" of another embodiment of the present invention comprises a ferrule 10 in which is integrally installed a ferrule optical fiber 11, a ferrule bush 15, an elastic member 20 installed at an outer side of the ferrule 10 so as to provide an elastic force, a plug flame 30 accommodating the ferrule 10 and the elastic member 20, a guide stop ring 40 engaged to the plug frame 30 for fixing the ferrule 10 and the elastic member 20 accommodated in the plug frame 30, a connector handle 60 accommodating the plug frame 30, a reinforcing sleeve 50 reinforcing the melted connection part of the ferrule optical fiber 11 of the ferrule 10 and the main optical fiber 80, and a boot 70 which is positioned at an outer side of the reinforcing sleeve 50 and is connected with the ferrule bush 15 installed at the ferrule 10.

As shown in FIGS. 9 to 12, the ferrule 10 has a through hole at an inner side for the purpose of installing the ferrule optical fiber 11, and at its one side is installed the guide ferrule bush 15.

The ferrule optical fiber 11 and the ferrule bush 15 are integrated with the ferrule 10 using an adhesive.

As shown in FIGS. 4 to 8, in the optical fiber connector "C", the diameter enlargement part 12 is provided at the ferrule 10, and the ferrule bush 15 is installed at the diameter enlargement part 12; however in the optical fiber connector "C" of another embodiment as shown in FIGS. 9 to 12, the diameter enlargement part 12 is removed from the ferrule 10, and the ferrule bush 15 is directly installed at the ferrule 10 while functioning as the diameter enlargement part 12.

The ferrule bush 15 has a step profile at an outer side thus supporting the coil spring which is the elastic member 20, and at the other side is provided a guide part 15-1 passing through the guide hole 42 formed at the guide stop ring 40, and at an end portion of the guide part 15-1 is provided an engaging part 15-2 having at least one protruded groove in which is installed the reinforcing sleeve 50, and at an outer surface of the guide part 15-1 is formed at least one plane part 15-4, and at an end portion is provided an engaging protrusion 15-3 for the sake of an engagement with the boot 70.

Figure 11:
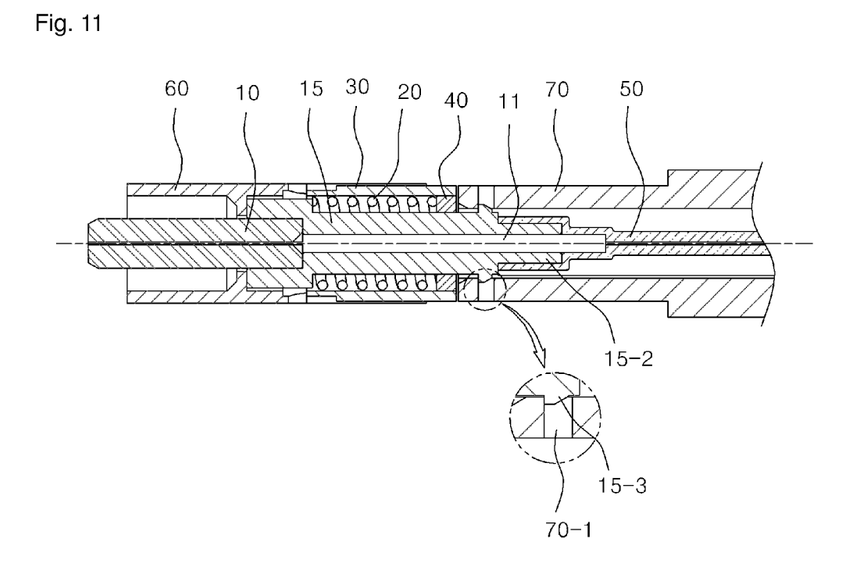
FIG. 11 is a cross sectional view illustrating a ferrule assembly and a reinforcing sleeve and a boot which are parts of a construction of an optical fiber connector according to another embodiment of the present invention while showing a construction before the ferrule assembly and the boot are assembled.
Figure 12:
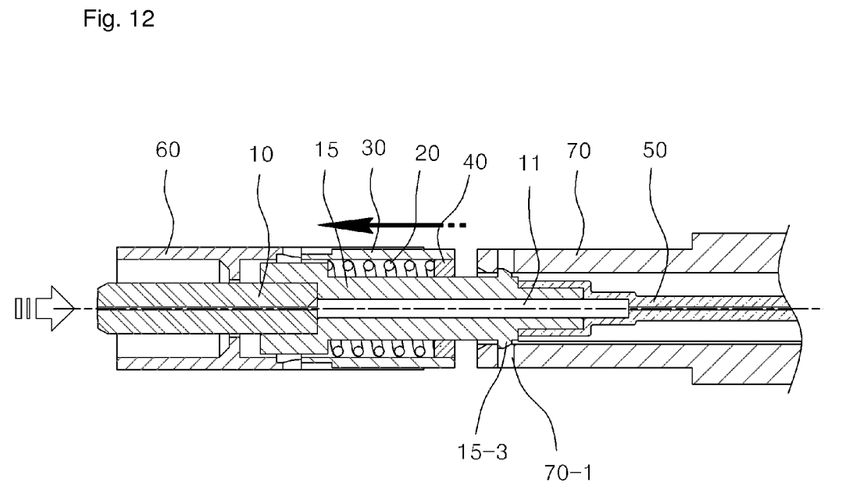
FIG. 12 is a cross sectional view illustrating a ferrule assembly and a reinforcing sleeve and a boot which are parts of a construction of an optical fiber connector according to another embodiment of the present invention while showing a construction after the ferrule assembly and the boot are assembled.
Figure 13:
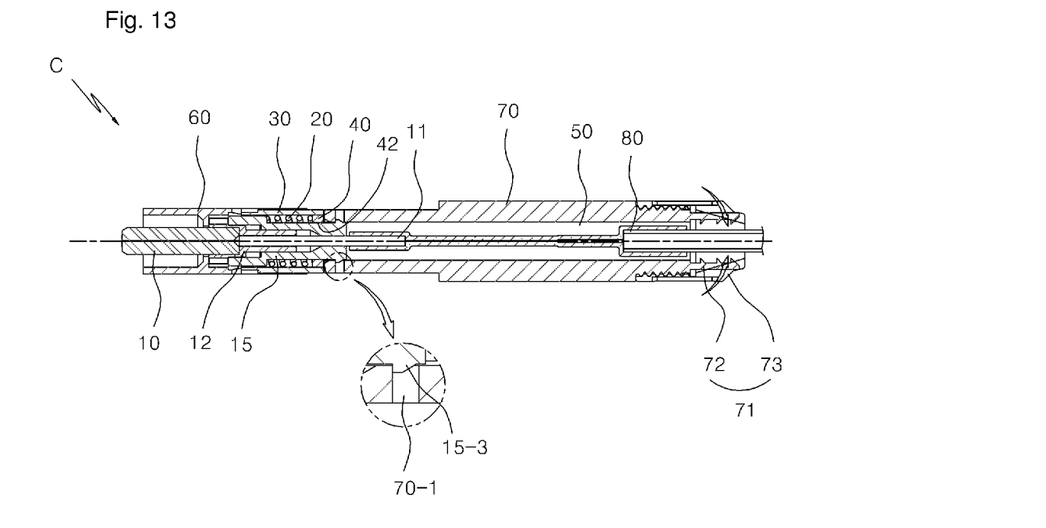
FIG. 13 is an assembled cross sectional view illustrating an optical fiber connector according to further another embodiment of the present invention.

As shown in FIGS. 11 and 12, the engaging protrusion 15-3 formed at an outer surface of the ferrule bush 15 is inserted into the engaging groove 70-1 formed corresponding to the engaging protrusion 15-3 at the end portion of the boot 70, so the ferrule bush 15 and the boot 70 are engaged.

The ferrule optical fiber 11 is protruded while passing through the ferrule bush 15 in such a way that its end is positioned at the ferrule 10, and it other end can be melted and connected with the main optical fiber 80. In the protruded end portions, the ends are provided unpeeled, so they are peeled at the on-site location using the peeling device.

Since the remaining constructions given the same reference numerals as the optical fiber connector "C" of FIGS. 4 to 8 are same as the construction of the optical fiber connector "C" of FIGS. 4 to 8, so they will be not described.

Although embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. An optical fiber connector in which a ferrule optical fiber accommodated in a ferrule elastically supported by an elastic member and a main optical fiber melted and connected by a melted connection part, and the melted connection part reinforced by a reinforcing sleeve so that the main optical fiber connects the ferrule optical fiber, comprising:
   a ferrule bush disposed between the ferrule and the elastic member, an engaging protrusion being formed at an outer surface of one end of the ferrule bush and the one end of the ferrule bush being engaged with the reinforcing sleeve when reinforcing the melted connection part; and
   a boot installed at an outer side of the reinforcing sleeve, having an engaging groove at an outer side of one end of the boot, and connected with the ferrule bush by inserting the engaging protrusion of the ferrule bush into the boot and engaging into the engaging groove of the boot at an on-site location.

2. An optical fiber connector in which a ferrule optical fiber accommodated in a ferrule elastically supported by an elastic member and a main optical fiber melted and connected by a melted connection part, and the melted connection part reinforced by a reinforcing sleeve so that the main optical fiber connects the ferrule optical fiber, comprising:
   a boot having an engaging groove at an outer side of one end of the boot;
   a ferrule bush being integrally formed with the ferrule and the ferrule optical fiber; and
   an elastic member disposed between the ferrule bush and a guide stop ring, an end portion of the ferrule bush or an end portion of the ferrule optical fiber passing through the guide stop ring and being integrally engaged with the reinforcing sleeve, wherein an engaging protrusion is formed at the outer surface of one end of the ferrule bush, wherein the boot is connected with the ferrule bush by inserting the engaging protrusion of the ferrule bush into the boot and engaging into the engaging groove of the boot at an on-site location.

3. The optical fiber connector of claim 1, wherein an end portion of the ferrule bush or an end portion of the ferrule optical fiber passes through a guide stop ring and is integrally engaged with the reinforcing sleeve.

4. The optical fiber connector of claim 1, wherein the ferrule bush has a through hole into which is inserted part of an enlargement tube provided at a side of the ferrule optical fiber of the ferrule, so the ferrule bush and the ferrule are separated.

5. The optical fiber connector of claim 1, wherein the ferrule bush is integrally assembled with the ferrule.

6. The optical fiber connector of claim 1, wherein the main optical fiber is clamped by a clamp cap installed at the boot installed at an outer side of the reinforcing sleeve reinforcing the melted connection part.

7. The optical fiber connector of claim 1, wherein an engaging part having at least one protruded groove is formed at an end portion of the ferrule bush, and the engaging part is installed surrounding an end portion of one side of the reinforcing sleeve, so the ferrule and the reinforcing sleeve are integrated.

8. The optical fiber connector of claim 1, wherein the ferrule bush is configured to move in a longitudinal direction of the optical fiber by a guide stop ring, and rotation of the ferrule bush is fixed in an axial direction of the optical fiber.

9. The optical fiber connector of claim 1, wherein the ferrule optical fiber is supplied in a ferrule assembly to prevent a coating of the ferrule optical fiber from peeling so that end portions of the ferrule optical fiber are peeled at the on-site location, and the ferrule bush in a construction belonging to the ferrule assembly is engaged with the reinforcing sleeve reinforcing the melted connection part.

10. The optical fiber connector of claim 3, wherein the ferrule bush has a through hole into which is inserted part of an enlargement tube provided at a side of the ferrule optical fiber of the ferrule, so the ferrule bush and the ferrule are separated.

11. The optical fiber connector of claim 3, wherein the ferrule bush is integrally assembled with the ferrule.

12. The optical fiber connector of claim 2, wherein the main optical fiber is clamped by a clamp cap installed at the boot installed at an outer side of the reinforcing sleeve reinforcing the melted connection part.

13. The optical fiber connector of claim 3, wherein the main optical fiber is clamped by a clamp cap installed at the boot installed at an outer side of the reinforcing sleeve reinforcing the melted connection part.

14. The optical fiber connector of claim 2, wherein an engaging part having at least one protruded groove is formed at an end portion of the ferrule bush, and the engaging part is installed surrounding an end portion of one side of the reinforcing sleeve, so the ferrule and the reinforcing sleeve are integrated.

15. The optical fiber connector of claim 3, wherein an engaging part having at least one protruded groove is formed at an end portion of the ferrule bush, and the engaging part is installed surrounding an end portion of one side of the reinforcing sleeve, so the ferrule and the reinforcing sleeve are integrated.

16. The optical fiber connector of claim 2, wherein the ferrule bush is configured to move in a longitudinal direction of the optical fiber by the guide stop ring, and rotation of the ferrule bush is fixed in an axial direction of the optical fiber.

17. The optical fiber connector of claim 3, wherein the ferrule bush is configured to move in a longitudinal direction of the optical fiber by the guide stop ring, and rotation of the ferrule bush is fixed in an axial direction of the optical fiber.

18. The optical fiber connector of claim 2, wherein the ferrule optical fiber is supplied in a ferrule assembly to prevent a coating of the ferrule optical fiber from peeling so that end portions of the ferrule optical fiber are peeled at the on-site location, and the ferrule bush in a construction belonging to the ferrule assembly is engaged with the reinforcing sleeve reinforcing the melted connection part.

19. The optical fiber connector of claim 3, wherein the ferrule optical fiber is supplied in a ferrule assembly to prevent a coating of the ferrule optical fiber from peeling so that end portions of the ferrule optical fiber are peeled at the on-site location, and the ferrule bush in a construction belonging to the ferrule assembly is engaged with the reinforcing sleeve reinforcing the melted connection part.

* * * * *